United States Patent

Cantonwine

[15] 3,694,733
[45] Sept. 26, 1972

[54] AUTOMOTIVE TIMING LIGHT TO MEASURE DWELL ANGLE

[72] Inventor: Charles R. Cantonwine, 950 Airport Road, Hot Springs, Ark. 71901

[22] Filed: July 7, 1970

[21] Appl. No.: 52,964

[52] U.S. Cl....................................324/15, 324/17
[51] Int. Cl..............................................F02p 17/00
[58] Field of Search..........................324/15–18, 91; 340/213; 73/116–118

[56] References Cited

UNITED STATES PATENTS

| | | | |
|---|---|---|---|
| 2,136,924 | 11/1938 | Reitherman | 324/16 T |
| 2,219,168 | 10/1940 | Thomas | 324/16 T |
| 3,148,327 | 9/1964 | Taylor | 324/91 |

*Primary Examiner*—Michael J. Lynch

[57] ABSTRACT

The conventional timing light used in automotive engine adjustments, flashes a stroboscopic light on a timing mark, usually located on the flywheel or front damper, indicating the firing of cylinder number 1, as caused by the *opening* of the distributor points. This invention teaches how the timing light can be made to also flash when the distributor points *close*. If an additional "points closing" mark is located on the same flywheel or damper as the "points opening" timing mark in an advanced position of the "points opening" timing mark, at the point where the distributor points should close to achieve the correct dwell angle, then the distributor can be adjusted to the precise dwell angle by aligning the two marks so they coincide. This will eliminate the need to look up, or even know the correct dwell angle in each case as is required using the present system. This invention will also teach a mode of construction to provide for measuring the dwell angle on engines not yet provided with the additional "points closing" mark.

3 Claims, 3 Drawing Figures

PATENTED SEP 26 1972  3,694,733
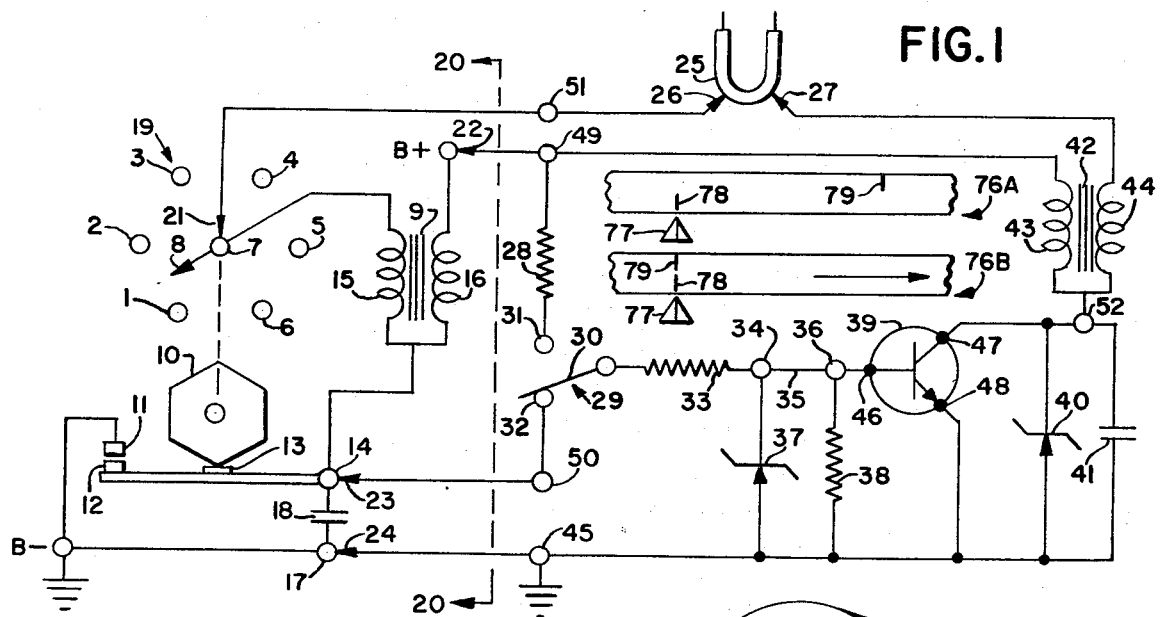
FIG. 1
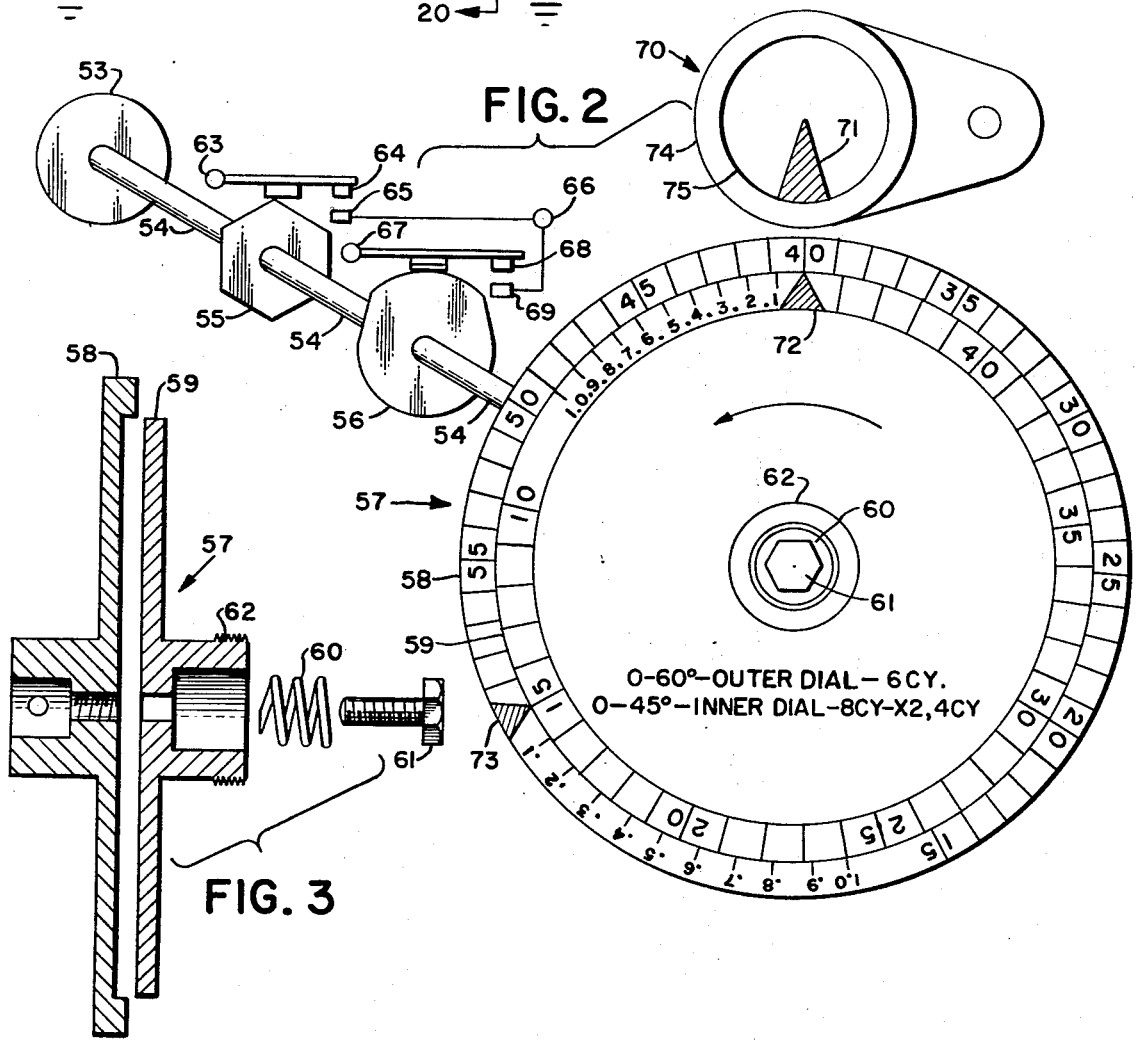
FIG. 2
0-60°–OUTER DIAL – 6 CY.
0-45°–INNER DIAL – 8CY-X2, 4CY
FIG. 3

3,694,733

AUTOMOTIVE TIMING LIGHT TO MEASURE DWELL ANGLE

BACKGROUND OF THE INVENTION

1. Field of Invention

This invention relates to stroboscopes in general and more particularily to improved means of using a stroboscopic timing light for indicating and determining the dwell angle of internal combustion engines distributor points, as well as calibrate dwell angle meters and tachometers.

2. Description of the Prior Art

In the past, it has been the practice to measure the dwell angle with a calibrated voltmeter which, at best, is subject to error due to rough handling and constant use. Some are even affected by point resistance and battery voltage.

SUMMARY OF THE INVENTION

The present invention overcomes these objectionable features by providing a relatively simple dwell angle measuring device that can never lose calibration, and the accuracy is limited only by the ability to read a dial calibrated to one-tenth of a degree, or better, which is far more accurate than required. The accuracy is not affected by point resistance, battery voltage, nor any other known conditions.

This invention will serve two distinct functions. Function (1) to indicate the correct dwell angle, and other purposes, on engines marked with a "points closing" mark located in advance position of the present "points opening" timing mark on top dead center (TDC). Function (2), to indicate the dwell angle, and other purposes, on engines not marked with a "points closing" mark.

It is therefore a principal object of this invention to provide a means to accurately and dependably adjust the distributor points of an internal combustion engine according to the manufacturers specifications without referring to charts or service manuals.

Another object of this invention is to provide means to accurately calibrate existing dwell meters to within one-tenth of a degree, or better.

Another object of this invention is to provide means of accurately calibrating tachometers.

Another of this invention is to provide and adjustable speed stroboscope accurately calibrated in revolutions per minute (RPM) and for stop-action study of engine valve springs and the like.

Another object of this invention is to provide a means of accurately adjusting distributors in a test stand for "off the engine" adjustments and tests.

Another object of this invention is to provide a means of measuring the dwell angle of any individual cylinder lobe, the two opposite cylinder lobes, the average of all lobes, or any combination thereof.

Another object is to provide a timing light that will fire a flash tube at the instant the distributor points close, or fire at the instant the points open, or fire at both the closing and opening instant.

Another object is to provide improved means of indicating the amount and position of imbalance when used on a dynamic balancing machine, by firing a stroboscopic light at both the closing and opening of the contacts on the dynamic balancer.

Another object of this invention is to provide an internal combustion engine that fires on the closing of the distributor points instead of firing on the opening of the distributor points which has been the practice in the past. The ignition system to be within the scope of this invention using any applicable solid state electronic or mechanical devices.

These and other objects and advantages of the present invention will become apparent after considering the following detailed specification in conjunction with the accompanying drawing.

BRIEF DESCRIPTION OF THE DRAWING

In the drawing:

FIG. 1 is a schematic wiring diagram showing the ignition system of a typical internal combustion engine, and the electronic circuit embodying the present invention for Function (1) and Function (2).

FIG. 2 is a schematic drawing showing a calibrating device embodying the present invention to be used in conjunction with the circuit shown in FIG. 1 for Function (2).

FIG. 3 is a detailed assembly drawing of rotating dial 57 shown in FIG. 2.

DESCRIPTION OF PREFERRED EMBODIMENT

Referring to the drawings by reference numbers, the number 20 in FIG. 1 refers to a typical automotive ignition system which has a distributor 19, an ignition coil 9 and a battery B plus and B minus.

The distributor 19 consists of a six cylinder distributor cap designated 1–7 having a rotor 8 driven by a six lobe cam 10. This invention is not restricted to six cylinders, but applies equally to any number of cylinders. The cam 10 is driven by the crankshaft at one-half the crankshaft speed, on a four cycle engine. Cam 10, in contact with rubbing block 13, opens and closes the contact points 11 and 12. Condenser 18 is connected across points 11 and 12. Coil 9 consisting of an iron core having a low resistance primary winding 16 and a high resistance, high voltage secondary winding 15 which is connected to the center terminal 7 of the distributor cap 19. All reference numbers above 20 represent the present invention. The basic circuit as shown in FIG. 1 requires only four connections to the ignition system. Clip 21 (arrow) is connected to the center terminal 7 of the distributor cap 19, clip 22 (arrow) is connected to the positive battery terminal B plus, clip 23 (arrow) is connected to the distributor points 14, and clip 24 (arrow) is connected to the battery negative B minus and ground through terminal 17.

The reference number 25 in FIG. 1 refers to a flash tube of a typical powered timing light, but has two ignition electrodes 26 and 27 instead of the usual one. It will be shown that electrode 27 flashes the tube 25 when the contact points 11 and 12 close, and electrode 26 flashes the tube 25 when the contact points 11 and 12 open. Although only one flash tube 25 is shown with the two ignition electrodes 26 and 27, this light can consist of a single flash tube having a single ignition electrode, by isolating the two high voltages from each other by a double spark gap for example, but each high voltage could feed the common ignition electrode; or it can have two separate flash tubes having one ignition electrode each and powered by a common power supply of ample capacity, which is the preferred embodiment; or there can be two completely independent timing lights. The D.C. power supply, or amplifier, is not shown as any conventional system can be used. Even plain neon timing lights can be used. All of these modes are within the scope of this invention. Any flash tube that flashes a light at short time intervals and duration may be synonomously referred to as timing light, stroboscope, stroboscopic flash light, strobe light, neon light and the like.

In FIG. 1, with contact points 11 and 12 open as shown, the full positive battery voltage is present at terminal 14. With clip 23 attached to terminal 14 a positive D.C. voltage is fed to the base 46 of transistor 39 through switch 29 stationary contact 32, movable contact 30, resistor 33, terminal 34, lead 35, terminal 36, resistor 38 and back to ground and battery negative B minus. Resistor 33 and resistor 38 form a voltage divider network, and zener diode 37 holds the transistor base 46 bias within safe limits. With the base 46 of NPN transistor 39 positively biased, the transistor 39 is conducting between collector 47 and emitter 48. With clip 22 connected to the battery positive B plus, current now flows through a standard ignition coil 42 primary 43, through terminal 52 to transistor 39 collector 47 to emitter 48 and back to the battery negative B minus and ground. This current builds up the ignition coil 42 in the usual manner. Condenser 41 is the usual ignition condenser and zener diode 40 is rated to protect the transistor 39 from the high voltage surges when the coil 42 fires. When the contacts 11 and 12 close, the positive bias is removed from the base 46 of transistor 39 and it ceases to conduct, which causes the coil 42 to generate a high voltage in the usual manner igniting flash tube 25 through ignition electrode 27 from coil 42 secondary 44.

With the contact points 11 and 12 closed, the coil 9 now builds up in the usual manner. When the contact points 11 and 12 open, the coil 9 secondary 15 generates a high voltage and ignites flash tube 25 through ignition electrode 26, and the cycle repeats itself.

In FIG. 1, the reference number 76A represents the flywheel, damper, or any other moving member of the engine, when not running. Reference number 77 represents the pointer, or indicator located on a stationary member of the engine. Reference number 78 represents the "points opening" mark, and number 79 the "points closing" mark. Reference number 76B, having an arrow pointing in the direction of rotation when running, and shows two marks 78 and 79 in line for correct dwell angle, as they appear under the flash tube light. This is the preferred embodiment. The existing timing mark 78 alone, could also be used by adding another stationary index pointer 77, but would have the disadvantage of requiring two separate observations at each pointer 77 and also allow for the degree of advance or retard. The preferred embodiment will show the correct dwell angle at all degrees of the spark advance or retard, provided of course the dwell angle does not change, and marks 78 and 79 will line up with each other, but not necessarily line up with stationary pointer 77, unless the spark is on TDC. Therefore pointer 77 is not required to read the dwell angle.

The flash tube 25 fires 12 times during one revolution of the cam 10, six times when the contact points 11 and 12 close and six times when they open. (for six cylinders)

When used in Function (1) each revolution of the crankshaft will show six flashes, three opening and three closing for cylinders 1, 2, and 3 in the firing order of 153624 (cylinders 1, 5, and 3) and will show one exposure of the point closing mark 79 and the points opening timing mark 78 at the indicator 77 for cylinder number 1. For the second revolution of the crankshaft there will be 6 flashes, three opening and three closing, for cylinders 4,5 and 6 in the firing order of 153624 (cylinders 6,2 and 4) and will show one exposure of the points closing mark 79 and the points opening mark 78 at the indicator 77 for cylinder number 6 (4th in the firing order). If the distributor is perfect, these two exposures will appear as one and be superimposed. Since these two flashes are from the opposite sides of the cam, any eccentricity of the cam will show up. This may be a desirable feature.

If it is desired to read the dwell angle on only one cylinder at a time, such as number 1, then connect clip 21 to the number 1 cylinder spark plug or distributor cap terminal number 1. This will cause the opening of the points to fire flash tube 25 from electrode 26 on the number one cylinder only, however the closing of the contact points will still cause the flash tube 25 to fire on each cylinder from ignition electrode 27. Provision can be made to cause the closing of the points to fire only on the number 1 (or any other selected cylinder) if desired. This can be accomplished in several ways that is well within the capabilities of one skilled in the art. A suggested method is to use a silicon controlled rectifier SCR, or similar device to activate the transistor 39 only between the firing of the last cylinder, on contact point opening and the firing of the first cylinder on contact point closing position. To do this, remove lead 35 from between terminals 34 and 36. Connect the anode of a SCR to terminal 34 and the cathode of the SCR to terminal 36. The gate of the SCR can be connected to a voltage divider network between distributor terminal 6 and ground so that when the 6th cylinder fires on the opening of the points, it triggers the SCR into conduction and builds up the coil 42. When the points 11 and 12 close on number one cylinder the SCR holding current drops to zero and deactivates the transistor 39 which fires electrode 27 and remains inactive until the gate of the SCR is again triggered by the firing of the number six cylinder.

From this suggestion and explanation, anyone skilled in the art can apply an SCR or similar device in the primary 16 circuit of coil 9, or in the primary circuit 43 of coil 42 to activate or deactivate the firing on any group of cylinders desired.

The circuit shown in FIG. 1 is for a single battery voltage and for negative ground. For 6, 12 and 24 volts for example, it is only necessary to insert the proper ballast resistor in series with the primary 43 of coil 42 by switching means. For a positive ground system, the NPN transistor 39 requires replacing, by switching means, with a PNP transistor. The two zener diodes 37 and 40 require reversing, by switching means, or two additional zener diodes could be attached to the PNP transistor to simplify switching.

The components used in a successful working model, although not necessarily the best values to use ultimately, are as follows: resistor 33, 50 ohms; resistor 38, 100 ohms; resistor 28, 10 ohms (not critical); zener diode 37, 4.7 volts; zener diode 40, 60 volts; transistor 39, NPN Sylvania ECG–130; switch 29, SPDT with off position; contact points 11 and 12, coiled 9 and 42, condensers 18 and 41 are all standard automotive parts.

The circuit shown in FIG. 1 is all that is required for Function (1) where the engine has been marked with a points closing mark.

Until such time that this invention is universally adopted it has been necessary to devise means of reading the dwell angle on engines not so marked. All conceivable methods have been tried or considered, such as applying precalibrated magnetic or adhesive tape or marker to the engine damper, or drive a calibrated disc from the moving engine parts, or synchronized therewith, but it has been concluded that the best all-around and simplest mode of operation is to use an existing, or built-in, dwell meter and tachometer which can be periodically calibrated accurately by the calibrating device shown in FIG. 2 and FIG. 3 using the present invention.

The circuit shown in FIG. 1 can be simplified even further if a transistor 39 is available that will withstand the high voltage surges, by eliminating condenser 41, zener diodes 37 and 40, and resistors 33 and 38.

The calibrator shown in FIG. 2 consists of an adjustable speed (200–2,000 RPM) 115 volt A.C. motor 53 driving a shaft 54, on which is secured a six lobe cam 55, a one lobe cam 56 and the calibrated dial 57. A set of adjustable contact points 64 and 65 are actuated to open and close by the six lobe cam 55. A set of adjustable (while running) contact points 68 and 69 are actuated to open and close by the one lobe cam 56.

The rotating calibrated dial 57 is shown in separated, cross sectional detail in FIG. 3, where dial 58 is fastened to the end of shaft 54 and calibrated 0°–60° for 6 cylinder engines as shown for a CCW rotation on the outer rim of the dial, having triangular pointer 73 located at zero and 60°. The inner dial 59 is calibrated 0°–45 for an eight cylinder engine (multiply the angle by 2 for four cylinder engines) as shown for a CCW rotation on the inner dial having triangular pointer 72 located at 0° and 45°. Dial 59 is held in friction contact with outer dial 58 by spring 60 and screw 61. Knob 62 is knurled and fastened to dial 59. To adjust the dials, pull out on knob 62 against spring 60 to turn freely to the desired degree setting, and then release slowly to get the precise angle. Each dial has a vernier scale to enable adjustment in increments of one-tenth of a degree. The dial is shown set at 40° on the outer dial by pointer 72. For most calibrating purposes, it is better to set the dial on a whole number, rather than a fraction. Instead of the knurled knob 62 and spring 60, a standard planetary geared down dial drive can be used for precise vernier adjustment.

The single lobe cam and points allow expanding the 60° over the entire circumference of 360°. If the six lobe cam is used the scale would be compressed 6 times.

The calibrator shown in FIG. 2 and FIG. 3 may be driven from the engine, or from the distributor while cranking and geared up 6 to 1, or may be driven by a synchronous motor through a converter deriving power from the engine battery through the distributor points and synchronized therewith, or by a sending device such as a Selsyn generator and motor, all of which are well within the scope of this invention.

In FIG. 2, the reference number 70 shows a 115 volt 60 Hz 450 RPM (200 RPM preferred) synchronous clock, or timer, motor having a stator 74 and an exposed rotor 75 having a triangular pointer 71. Clock motor 70 is used only to calibrate tachometers against 60 Hz frequency which is considered a very accurate reference source for such purposes, if obtained from the regular Utility Co. outlet.

The switching means for each operation has purposely been omitted to simplify the drawings and permit a clearer understanding of the principles of operation. The connections required, and the results, are stated under each of the following operations. Anyone skilled in the art can arrange the switching sequence to suit.

The present invention can very well be used for other purposes to fire in reverse order, that is, fire first on the opening of the switching means and second on the closing of the switching means.

A switching device, or switching means, is defined herein as any mechanical, electrical or other means of providing a relatively low impedance referred to as the closed position, or activated, and a relatively high impedance, referred to as the open position, or deactivated, or the application or removal of a voltage source, or the application of a generated wave shape, or any form of pickup or sensing device. Anyone skilled in the art can adapt this invention to any ignition system such as, pointless, transistorized, condenser discharge (C-D), magnetos, balancing machine senders and the like, all of which are within the scope of this invention.

Dwell angle is herein defined as the percentage of time, expressed in degrees, that the distributor points remain in a closed position relative to the total time between the first and second opening position of the distributor points. The average dwell angle for engines is approximately two-thirds of the total time, or 67 percent of full dwell.

OPERATIONS THAT CAN BE PERFORMED WITH THE PRESENT INVENTION

1. TIMING LIGHT ONLY. For a conventional single flash timing light, connect clip 21 to number 1 on the distributor cap 19, or number 1 spark plug. Turn off switch 29 to place movable contact 30 midway between stationary contacts 31 and 32. Proceed to use the timing light flash tube 25 in the usual manner with the engine running. The dwell meter and tachometer can be connected to terminals 50 and ground terminal 45 (or the recommended connection) and left in this position, unless otherwise specified.

2. FUNCTION (1). To adjust the dwell angle on engines having a TDC or points opening mark and a points closing or dwell angle mark, connect clip 21 to the center terminal 7 of the distributor 19. Leave switch 29 in the position shown in FIG. 1 with movable contact 30 engaging stationary contact 32. With the engine running, use the dual timing light 25 and adjust the distributor dwell angle until the marks on the flywheel or damper are alongside of each other or superimposed, as shown in member 76B FIG. 1.

3. TO CALIBRATE A DWELL ANGLE METER. In the past, dwell angle meters have been calibrated by using a square wave generator, which determined only one point of calibration at 50 percent, whereas the important point is a-proximately 67 percent. This invention can calibrate precisely at any angle between zero and full dwell. To calibrate, connect dwell meter to terminals 50 and terminal 45. With ignition "on," turn engine over by hand until points 11 and 12 open, as indicated by a zero dwell angle reading. Leave ignition on, but do not start engine. This operation can be performed independently of an engine if an ignition coil and condenser be built into the unit. Connect terminal 67 (contact point 68) to terminal 50, and connect terminal 66 (contact point 69) to ground terminal 45. Switch 29 and clip 21 should be in the position shown in FIG. 1.

For 0°–60° on six cylinder engines, set pointer 72 for desired dwell angle on the outer dial 58. For 0°–45° on eight cylinder engines set pointer 73 to desired dwell angle on inner dial 59. For four cylinders use eight cylinder dial and multiply by 2. Connect motor 53 to power and adjust speed to just fast enough to show a steady reading on the dwell meter. Focus the twin timing light 25 on the rotating dial 57 near the area where the two triangular pointers 72 and 73 are near together. Adjust the contact points 68 and 69 until the two pointers 72 and 73 are exactly opposite each other, and read the dwell meter. If it does not read the same as the degrees set on dial 57 then readjust the dwell meter if possible, if not make a chart showing the amount to add or subtract. Usually only one point in the commonly used range is sufficient. There will be two other pointers appearing on the dial 57. Pointer 73 will appear as shown and pointer 72 will appear at the 20°–30° point. The reason for this, is that when the light flashes on the closing of the points, they are in the position shown, 40° before the points open, and when the points open, the dial 57 has rotated 40° CCW placing pointer 73 exactly where pointer 72 was. Due to retentivity of the eye, it appears to still be there, but it actually has moved around to the 20°–30° point and will appear there. This is not objectionable, nor confusing, and cannot possibly give an erroneous alignment. This could be prevented by mounting two flash tubes in back of the dial, but it would complicate the construction. The cam 56 and the bearings carrying shaft 54 require careful design in order to repeat readings to within a tenth of a degree. The cam 56 must open and close the contacts rapidly to avoid flutter of the observed pointers. The dial 57 should be adjustable on shaft 54 to initially set it in relation to cam 56 so that the pointers line up in the area at the top near motor 70 so that a single mounting bracket can hold the timing light for dwell and tachometer calibrations.

This dwell angle calibrator is even more precise than the timing light itself. It is well known that there is an insignificant, but measurable, time delay between the opening of the contacts, and the time the light is seen by the eye. This delay may be in the order of about one-thousandth of a degree. If the first timing light that flashes on the closing of the contacts has the same delay as the light that flashes on the opening of the contacts, then these two equal delays offset each other. It can therefore be said that the interval between the two flashes (dwell angle) is so precise that the present invention can appropriately be classified as a PRIMARY STANDARD DWELL ANGLE CALIBRATOR. It can never lose calibration, and there is no calibration of the instrument itself, all calibration consists of mechanical location of timing marks or calibrated dials with the accuracy limited only by readability. Anyone skilled in the art can devise means of measuring the dwell angle to any degree of accuracy desired, even to one-millionth of a degree or better.

4. TO CALIBRATE A TACHOMETER. Starting from scratch as shown in FIG. 1 and FIG. 2, with the points 11 and 12 still open and ignition "on," but engine not running, disconnect clip 21 from the center of distributor 19 terminal 7. Connect terminal 63 (contact 64) to terminal 50, and connect terminal 66 (contacts 65 and 69) to the ground terminal 45. Connect terminal 67 (contact 68) to stationary contact 31 of switch 29 and turn switch 29 movable contact 30 to engage stationary contact 31. Connect tachometer between terminal 50 and ground terminal 45, and set to "6 cylinders". Connect synchronous motor 70 to 115 V.A.C. 60 Hz frequency regulated power source, such as any Utility power outlet. Connect adjustable speed motor 53 to power source. Turn the ignition on (points 11 and 12 open) but engine not running. This calibration can be made independent of the engine if a separate coil and condenser be built into the calibrator. Focus the timing light 25 on clock 70 rotor 75 and adjust the speed of motor 53 to show approximately 450 RPM on the tachometer. Adjust the speed of motor 53 until the triangular pointer 71 is standing perfectly still. The tachometer should read exactly 450 RPM (or the speed of motor 70). Only one triangle should appear in double exposure (brighter) because it is running twice as fast as the calibrator motor 53. The cam 55 runs only one-half the crankshaft speed as shown on the tachometer. Switch the tachometer to "8 cylinders" and read 337½ RPM, and to "4 cylinders" and read 675 RPM with triangle 71 still stationary. Switch tachometer to "6 cylinders" and increase the speed of motor 53 to read approximately 900 RPM on the tachometer, and adjust motor 53 speed so pointer 71 in single exposure is perfectly stationary. That is 900 RPM on "6 cylinders," 675 RPM on "8 cylinders" and 1,350 RPM on "4 cylinders." Two triangles 71 will appear at 1,800, 1,350 and 2,700 respectively and so forth.

If the tachometer is adjustable, correct the calibration, otherwise make a chart to show the amount to add or subtract at each range or reading.

Another simple method to calibrate a tachometer is to use the motor 70 in the same way but use a conventional timing light in the same manner and connections used to time an engine. Focus the timing light on motor 70 rotor 75 and follow the instructions above, changing the engine speed to obtain stop-action. In this case the flash tube fires on the *opening* of the contacts.

5. STROBOSCOPE. With the tachometer accurately calibrated, this calibrator can be use to measure RPM, belt speed and the like at a distance without any mechanical connection. It is valuable in automotive service to study valve spring action for example, by stop-motion observations. Use the same connections as 4. (next above) TO CALIBRATE A TACHOMETER.

6. DYNAMIC BALANCERS. The present invention provides an improved means of stopping action in a dynamic balancing machine. Any machine operated by mechanical, magnetic, inductive or electronic switching means can flash a strobe light at the closing as well as the opening of the contacts, providing a more accurate means of determining the exact point and amount of lateral movement or imbalance. For example, the dwell angle will indicate the amount of imbalance by holding the contact points closed for a longer period of time.

7. DISTRIBUTOR TEST STAND. The conventional distributor test stand for testing and adjusting distributors off the engine, uses a single timing light usually rotating with a disc and mounted in back of the disc with a dial calibrated in degrees. This timing light, or flash tube fires on the opening of the distributor points and shows the angle of firing for each cylinder. A second flash tube using the present invention, could be mounted adjacent to the existing flash tube to indicate the dwell angle, thus eliminating the dwell meter built into the unit, and providing a more accurate adjustment of the dwell angle.

It is now apparent that there has been provided a novel stroboscope construction which fulfills all of the objects and advantages sought therefor. Furthermore, this invention is intended to cover all changes, alterations and modifications of the examples of the invention herein chosen for purposes of disclosure, which do not constitute departures from the spirit and scope of the invention, and all such changes, alterations and modifications which will be readily apparent to one skilled in the art are contemplated as being within the scope of the present invention which is limited only by the claims which follow.

What I claim is:

1. A device for use in testing automotive ignition systems comprising; switch means, a rotatable element, means rotating said rotatable element at an adjustable speed, means mounted on said rotatable element actuating said switch means at least one time for each revolution of said element, a first member having at least one indicia thereon mounted, for rotation, on said element, a second member having at least one indicia thereon mounted, for rotation, on said element, flash tube means for stroboscopically illiminating said first and second members, first circuit means connecting said switch means to said flash tube means for firing said flash tube means in response to the opening of said switch means and second circuit means connecting said switch means to said flash tube means for firing said flash tube means in response to the closing of said switch means.

2. An automotive timing light having a stroboscopic lamp, a high voltage power supply for said lamp and means for connecting the high voltage portion of the automotive ignition circuit to said lamp for firing said lamp when the the distributor points open, the improvement comprising, circuit means for connecting across the distributor points of the automotive ignition circuit for producing a signal when said distributor points close and means responsive to said signal for firing said stroboscopic lamp.

3. A timing indicator system on an internal combustion engine comprising a moving member of said engine and a stationary member of said engine having a timing mark thereon for the purpose of adjusting the timing and firing of the number one cylinder by observing the said timing marks under a timing light, said engine having an ignition system including distributor points, said ignition system producing an ignition signal on the opening of said distributor points, a stroboscopic flash light including firing electrode means, means connecting said electrode means to the high voltage portion of said ignition system for firing said light when said distributor points open, wherein the improvement comprises circuit means connected across said distributor points producing a signal when said points close, means connected to said electrode means and signal firing said light when said points close and an additional timing mark on one of said members, said stroboscopic flash light, when focused on said first member and said second member, by stop-action indicating the correct dwell angle of said distributor points.

* * * * *